United States Patent
Kikuchi et al.

(10) Patent No.: US 6,781,738 B2
(45) Date of Patent: Aug. 24, 2004

(54) ANTIGLARE ANTICLOUDING DEVICE AND AUTOMOTIVE OUTER MIRROR

(75) Inventors: Hideyuki Kikuchi, Shizuoka (JP); Masaki Kobayashi, Shizuoka (JP); Toru Komatsu, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/381,044

(22) PCT Filed: Jul. 26, 2001

(86) PCT No.: PCT/JP01/06426
§ 371 (c)(1),
(2), (4) Date: Mar. 25, 2003

(87) PCT Pub. No.: WO03/012540
PCT Pub. Date: Feb. 13, 2003

(65) Prior Publication Data
US 2004/0032655 A1 Feb. 19, 2004

(51) Int. Cl.⁷ .............................. G02F 1/157; G02F 1/15
(52) U.S. Cl. ........................................ 359/265; 359/267
(58) Field of Search ................................. 359/265, 267, 359/270, 274, 273, 321, 614

(56) References Cited

U.S. PATENT DOCUMENTS 6,185,034 B1 * 2/2001 Nakamura et al. .......... 359/265

FOREIGN PATENT DOCUMENTS

| EP | 816466 | 1/1998 |
| EP | 1003067 | 5/2000 |
| JP | 3-12223 | 2/1991 |
| JP | 09-225303 | 9/1997 |
| JP | 10-036144 | 2/1998 |
| JP | 2000-155344 | 6/2000 |

* cited by examiner

Primary Examiner—Georgia Epps
Assistant Examiner—Richard Hanig
(74) Attorney, Agent, or Firm—Oblon, Spivak, McClelland, Maier & Neustadt, P.C.

(57) ABSTRACT

An anti-glare element provided with a front side substrate comprising a substrate having a wave length selective property, and a back side substrate comprising a transparent substrate and having electrochromic films which exhibit an electrochromic phenomenon interposed between the front side substrate and back side substrate, wherein a photocatalyst film comprising a photocatalyst substance having transmittivity and a hydrophilic functional film comprising a hydrophilic film of a hydrophilic substance are formed on the front side of the front side substrate comprising a substrate with said wave-length selective property, to thereby give an anti-fog function. Or electrode-cum-reflective film is formed on the backside film of the electrochromic film, to thereby achieve a reflective mirror. An anti-glare and anti-fog element or an exterior mirror for automobiles wherein spectral reflectance characteristics of the anti-glare and anti-fog element can be set so that predetermined color phase may be presented at the time of un-operating of an anti-glare function by a substrate having wave length selective property, and along with this surface dirt can be disassembled and economical efficiency and chemical stability are satisfied, can be provided. Also, color phase of the mirrors which have mutually different functions among plurality of mirrors is determined as a predetermined color phase, and the color phase can be set to the same extent, and the combination of the mirror which does not give a sense of incongruity visually can be embodied.

20 Claims, 8 Drawing Sheets

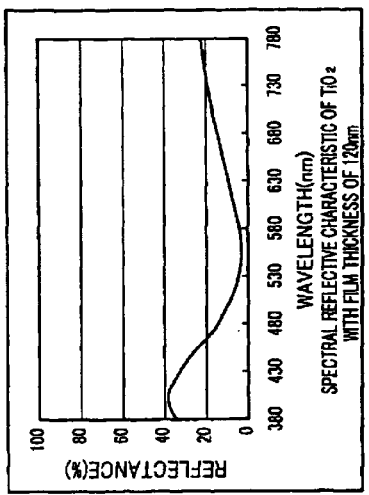
FIG.10A
PURPLE TONE COLOR PHASE
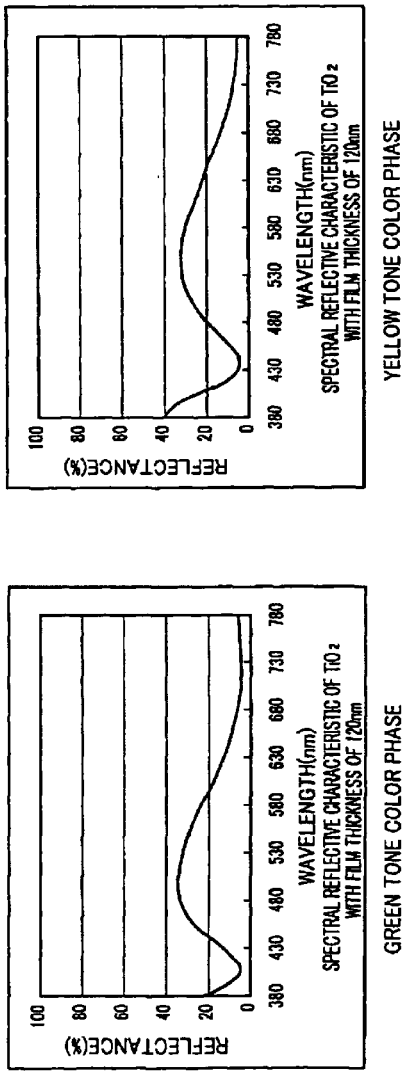
FIG.10B
BLUE TONE COLOR PHASE
FIG.10D
YELLOW TONE COLOR PHASE
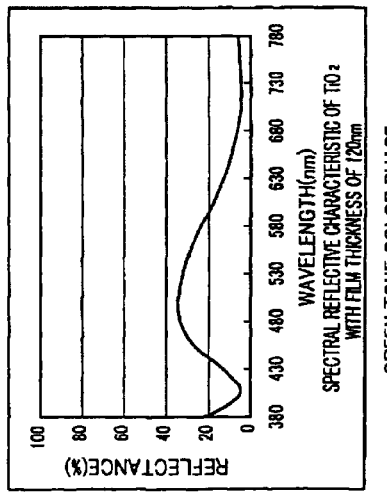
FIG.10C
GREEN TONE COLOR PHASE

HYDROPHILIC FUNCTIONAL
FILM IS A TWO-LAYER FILM

HYDROPHILIC FUNCTIONAL
FILM IS A MIXED LAYER

HYDROPHILIC FUNCTIONAL
FILM IS SINGLE LAYER

US 6,781,738 B2

ANTIGLARE ANTICLOUDING DEVICE AND AUTOMOTIVE OUTER MIRROR

FIELD OF THE INVENTION

This invention relates to an anti-glare and anti-fog element having an anti-glare function using an electrochromic phenomenon, and an anti-fog function by a hydrophilic functional film comprising a photocatalyst substance, and more particularly relates to an anti-glare and anti-fog element and an exterior mirror for automobiles, which utilize predetermined color phase at the time of un-operating of the anti-glare function.

BACKGROUND OF THE INVENTION

An anti-fog element or anti-fog mirror which causes an anti-fog function to be exhibited by a hydrophilic functional film comprising a photocatalyst substance is mentioned for example as conventionally known technology. For example, in JP-A-09-225303 a semiconductor photocatalyst substance and a photocatalyst composition which comprises oxide particle distributed in this semiconductor photocatalyst substance wherein the band gap of the photocatalyst composition is 0.05 eV larger or more than the band gap of a simple semiconductor photocatalyst substance, are produced. In this invention, a photocatalyst composition excellent in photocatalyst activity, having an improved intensity of a photocatalyst film and a substrate with photocatalyst composition can be achieved and can be adapted to such as an anti-fog element.

Further, JP-A-10-36144 proposes an anti-fog element constituted in such a manner that a transparent photocatalytic reaction substance film such as $TiO_2$, is formed on one surface of a transparent substrate member such as a glass substrate, and transparent inorganic oxide substance such as $SiO_2$ is formed thereon to transparently constitute the whole part. In this invention, an anti-fog element is constituted in such a way that an inorganic oxide film in a porous state is formed on the surface of a substrate member such as a glass substrate so that the surface exhibits hydrophilicity. Fall of hydrophilicity can be thus prevented and an anti-fog element which can hold an expected anti-fog property over a long period of time can be achieved.

On the other hand, as a conventional anti-glare element or anti-fog mirror, those which exhibit the antiglare function by electrochromic substance can be mentioned, for example. For example, in JP-09-120088, at least one kind of cathode electrochromic compound, at least one kind of anode electrochromic compound, and single block type self-erasure system solution phase electrochromic device and a device using the same are disclosed. This invention proposes an anti-glare mirror for automobiles serving as a reflection mirror wherein the light of the intensity permissible for a driver is reflected. As an element or a mirror, which allows a coexistence of the above anti-fog function and the anti-glare function, these inventors produced an electrochromic element arranged in such a manner that electrochromic films comprising electochromic substance and electrolysis is arranged between a transparent electrode films provided on two glass substrates, a hydrophilic film comprising a photocatalyst film and a porous inorganic substance are formed on the front surface of the glass substrate of the front side, and with this arrangement, an electrochromic element as a reflector with reflective film formed on the front surface of the backside substrate viewed from the front side substrate is produced. According to this invention, since the surface is formed in hydrophilic state having a photocatalyst function, a photochromic phenomenon of electrochromic films are prevented as well as having an anti-fog function and anti-glare function. This permits an electrochromic element to be realized without adding an ultraviolet-rays absorbent to the aforementioned electrolysis liquid, or with a little bit of addition of the ultraviolet-rays absorbent.

Here, the aforementioned "an electrochromic phenomenon" is the general term of the phenomenon in which the color of a substance changes with an application of voltage. Here, a "substance" and a "film" which exhibit such an electrochromic phenomenon are called an "electrochromic substance" and "electrochromic films", respectively.

If the element or mirror which has an anti-glare function and an anti-fog function thus described is applied to a mirror for such as automobiles, dazzle of catoptric light and surface fog can be prevented, and driver's visibility can be kept good. Mirrors for automobiles usually include a driver's seat side mirror and a passenger seat side mirror. A driver's seat side mirror and a passenger seat side mirror having almost equal anti-glare function and an anti-fog function were conventionally and mainly in use. However, in such a mirror for automobiles, combination of the mirror having the function of necessary minimum for each side of a driver's seat and a passenger seat, or a different function is increasingly demanded, considering from economical efficiency in recent years.

For example, combination of the aforementioned mirrors for automobiles is considered to be variably carried out such as a combination of a driver's seat side mirror having the automatic anti-glare function which made reflectance variable, and a passenger seat side mirror having an anti-glare function with fixed reflectance (for example, anti-glare function colored blue) and an anti-fog function. Since especially the mirror having the aforementioned automatic anti-fog function is not colored in comparatively bright state, that is, the state in which an anti-glare function is not needed, for example in the daytime, either of or both of color phase and color tone which each of a driver's seat side mirror and a passenger seat side mirror presents differs. Especially, when the anti-fog function is not operating in a driver's seat side mirror, the difference between this color phase and color tone becomes remarkable. Incidentally, generally the attribute of visual and sensory cognition of colors such as red, yellow, green, blue, and purple is meant as the above "color phase." The aforementioned "a color tone" generally means grades, such as a shade of color, strength, and contrast, and both of these are combined to be referred hereinafter as only "color phase".

Furthermore, difference in color phase between the mirror of the aforementioned driver's seat side and the mirror of a passenger seat side is emphasized in the daytime at the time of not operating of the mirror of the aforementioned driver's seat side having anti-glare function and when the degree of brightness is comparatively large. Consequently, a man is likely to have comparatively strong sense of incongruity to the difference in color phase between the mirrors caused by such a combination of mirrors. For this reason, in an automobile having different function of mirrors of driver's seat side and passenger seat side in a corresponding manner respectively, the mirror of the aforementioned driver's seat side and the mirror of passenger seat side present the almost same color phase. Thus, it is demanded that the combination of the mirror in which a man does not have a sense of incongruity is carried out.

SUMMARY OF THE INVENTION

In view of the above-described problems, the object of this invention is to provide an anti-glare and anti-fog element which can be set so as to have both an anti-glare function and an anti-fog function and present a predetermined color phase at the time of un-operating of the aforementioned anti-glare function, and an exterior mirror for automobiles using this anti-glare and anti-fog element.

BRIEF DESCRIPTION OF THE DRAWINGS

FIG. 10 is a graph of an anti-glare and anti-fog element according to this invention, and spectral reflectance characteristics is shown while various kinds of color phase are presented. Spectral reflectance characteristics is shown while purple tone is presented in FIG. 10A, spectral reflectance characteristics is shown while blue tone is presented in FIG. 10B, spectral reflectance characteristics is shown while green tone is presented in FIG. 10C, and spectral reflectance characteristics is shown while yellow tone is presented in FIG. 10D.

PREFERRED EMBODIMENT OF THE INVENTION

Figure 1:
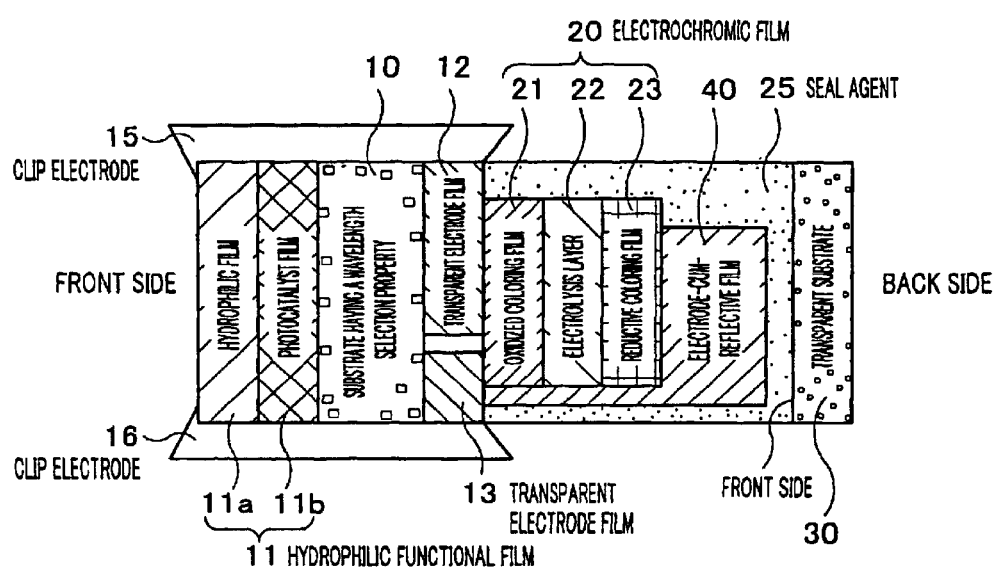
FIG. 1 is a view schematically representing a structure of the embodiment 8 of an anti-glare and anti-fog element according to this invention, wherein a reflector type is constituted with a reflective film serving as an electrode of electrochromic films.

In order to solve the aforementioned problem, an anti-glare and anti-fog element of this invention is arranged in such a manner that electrochromic films which exhibit an electrochromic phenomenon are intervened between a transparent substrate arranged in the front side, and a transparent substrate arranged in the backside so as to be provided with an anti-glare function, wherein transparent substrate of the front side comprises a substrate with a wave length selective property, and anti-fog function is given by forming a hydrophilic functional film including a photocatalyst film which comprises a photocatalyst substance and has light transmittivity, on the front surface of the transparent substrate of the front side.

Incidentally, here, the above "wave length selective property" means the characteristic wherein the light of specific wavelength among the lights of carrying out incidence from the front side of the aforementioned anti-glare and anti-fog element is reflected or transmitted alternatively. Namely, the aforementioned "wave length selective property" is specified by spectral reflectance characteristics of the transparent substrate of the front side included in this invention as referred below, or a spectral transmittivity characteristics. Since there is a correlation between this spectral reflectance characteristics and spectral transmittance characteristics, the "wave length selective property" according to this invention is uniquely determined by the spectral reflectance characteristics or the spectral transmittance characteristic.

In the aforementioned anti-glare and anti-fog element, it is desirable to constitute a hydrophilic functional film by a photocatalyst film comprising a photocatalyst substance of titanium oxide independently.

Further, in the aforementioned anti-glare and anti-fog element, a hydrophilic functional film may be constituted including a photocatalyst film which comprises a photocatalyst substance of titanium oxide, and hydrophilic film which comprises a hydrophilic substance of silicon oxide.

Also, in the aforementioned anti-glare and anti-fog element, the hydrophilic film is preferably constituted by porous silicon oxide.

Incidentally, surface coarseness (arithmetic average coarseness Ra) of this porous silicon oxide may be set as 2 nm or more.

And in the aforementioned anti-glare and anti-fog element, a reflective film is preferably formed on the backside of the transparent substrate of back side viewed from the transparent substrate of the front side which has a wave length selective property.

Further, a reflective film may be formed on the front side of the transparent substrate of back side viewed from the transparent substrate of the front side which has a wave length selective property. And this reflective film may also serve as function of electrode to perform power feeding to the electrochromic films.

Furthermore, an anti-glare and anti-fog element as anti-glare and anti-fog mirror thus described is preferably used for an exterior mirror for automobiles.

Exemplary embodiment of this invention will now be specifically explained in conjunction with the drawings. Incidentally, the portions of the same designation as those in each embodiment used for the explanation so far are designated the same numerals and signs, omitting and simplifying the overlapping explanation.

An anti-glare and anti-fog element according to this invention includes an electochromic film to exhibit an anti-glare function, and also hydrophilic functional film to exhibit the hydrophilic function, and further a substrate which has a wave length selective property so as to present a predetermined color phase at the time of un-operating of the anti-glare and anti-fog function. Also, a transmitting type and a reflector type are included in the anti-glare and anti-fog element according to this invention. As referred below, embodiments 1 to 4 are structured as a transmitting type anti-glare and anti-fog element, and embodiments 5 to 9 are structured as a reflective anti-glare and anti-fog element (anti-glare and anti-fog mirror). Incidentally, in the explanation of these embodiments, "front side" and "back side" are respectively based on the case viewed from the front side (side where light carries out incidence) of an anti-glare and anti-fog element.

Embodiment 1

Transmitting Type Anti-glare and Anti-fog Element

Figure 2:
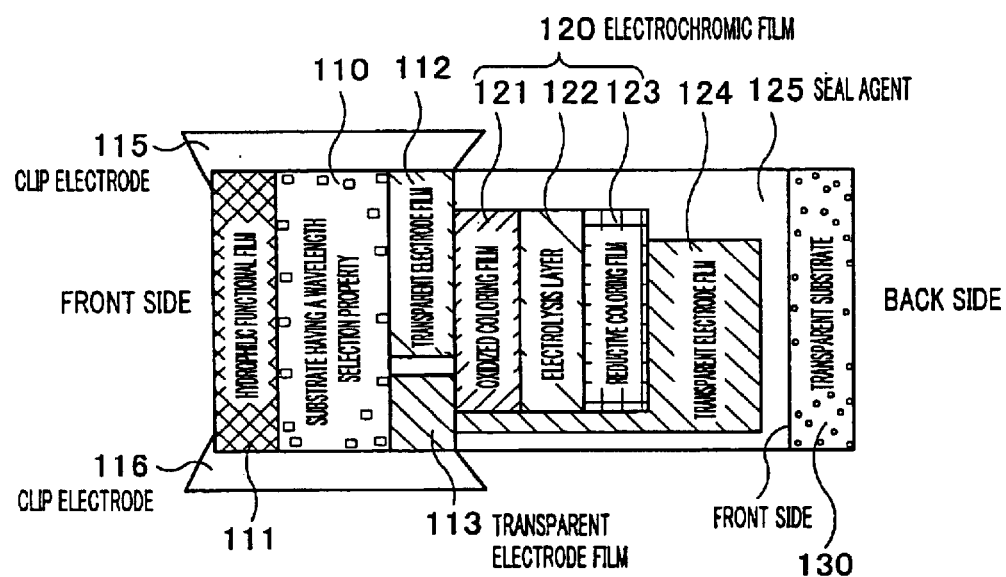
FIG. 2 is a block diagram schematically representing a structure of the embodiment 1 of an anti-glare and anti-fog element according to this invention, wherein a transmitting type is constituted.

FIG. 2 is a cross-sectional view of the embodiment 1 of an anti-glare and anti-fog element according to this invention which is enlarged and shown in the thickness direction. As shown in FIG. 2, this anti-glare and anti-fog element is structured in such a way that an opposing arrangement of the front side substrate 110 which comprises the substrate having a wave length selective property as a substrate and back side substrate 130 which comprises a transparent substrate (glass) is carried out, and electochromic film 120 which exhibits electrochromic phenomenon is interposed between these front side substrate 110 and back side substrate 130.

Also, hydrophilic functional film 111 is provided on the front side of the front side substrate 110. This hydrophilic functional film 111 comprises a photocatalyst substance (not shown) having photocatalyst functions such as titanium oxide, and a hydrophilic substance (not shown) having hydrophilicity such as silicon oxide. By this hydrophilic functional film 111, the surface of this anti-glare and anti-fog element can present hydrophilicity, and can prevent adhesion of the water-drip to the surface of the anti-glare and anti-fog element. In addition, since the photocatalyst substance (not shown) included in the hydrophilic functional film 111 can disassemble and remove organic matters, such as dirt adhering to the surface of this anti-glare and anti-fog element, it becomes possible to hold the hydrophilicity of the surface of this anti-glare and anti-fog element appropriately. Further, if the aforementioned hydrophilic substance is structured with a porous silicon oxide film, required hydrophilicity can be obtained comparatively easily.

Incidentally, this hydrophilic functional film 111 may be structured with photocatalyst substance independently as needed, or may be structured with "laminates structure" comprising films of photocatalyst substance and other substance, or "mixed and distributed films." of photocatalyst substance and other substance.

Also, on the backside of the front side substrate 110, electrochromic films 120 are included. These electrochromic films 120 are formed in such a way that transparent film 112 comprising such as indium tin oxide (ITO) and tin oxide ($SnO_2$), oxide coloring film 121 comprising such as iridium oxide (IrOx) and nickel oxide (NiOx), electrolyte film 122 comprising solid electrolytes such as tantalum oxide ($Ta_2O_5$), and reductive coloring film 123 comprising such as tungsten oxide ($WO_3$) and molybdenum oxide ($MoO_3$), are laminated one by one. And these electrochromic films 120 are sealed between this front side substrate 110 and the back side substrate 130 by seal agent 125 which is circumferentially arranged. Incidentally, this seal agent 125 is not construed as being limited thereto but may be substituted by, such as epoxy resin unless the effect of this invention can be presented.

And clip electrode 115 is put between one side of the front side substrate 110, and this clip electrode 115 is connected to the transparent electrode film 112. Moreover, clip electrode 116 is put between the side of another side of the front side substrate 110, and this clip electrode 116 is connected to transparent electrode film 124 through transparent electrode film 113. In addition, between the transparent electrode film 112 and the transparent electrode film 113, processing of etching and the like is performed and a predetermined insulating film (not shown) is formed. Or, between the transparent electrode film 112 and the transparent electrode film 113, such as etching may be processed and a predetermined oxide coloring film (not shown) may be formed. And by giving a voltage of negative polarity to the clip electrode 116 while giving the voltage of positive polarity to the clip electrode 115 from an external power supply (not shown), electrochromic films 120 are colored in predetermined color phase. The colored electrochromic films 120 are decolorized by giving reverse polar voltage to these grip electrodes 115 and 116, or short-circuiting between the clip electrodes 115 and 116.

According to an anti-glare and anti-fog element constituted as described in the foregoing, anti-glare effect by coloring of electrochromic films 120 is obtained. Moreover, since the water adhering to the surface of this anti-glare and anti-fog element is thinly damp in layer structure and spreads due to the hydrophilicity of hydrophilic functional film 111, formation of water-drip is prevented and the anti-fog effect is obtained. Further, if ultraviolet rays carry out incidence from the surface of this anti-glare and anti-fog element, these ultraviolet rays will be absorbed by the photocatalyst substance (not shown) included in the hydrophilic functional film 111, and will excite this photocatalyst substance to be energized. Consequently, within this photocatalyst substance, the pair (an electron and electron-hole pair) of an electron and an electron-hole occurs. This electron and electron hole-pair react with air and water on the surface of the hydrophilic functional film 111, and •$O_2$— (super oxide an•ion) which is rich in oxidization power, and •OH (hydroxyl radical) are caused to be generated. These •$O_2$— and •OH may decompose and remove organic matters such as a contaminant adhering to the surface of the hydrophilic functional film 111 efficiently. Therefore, they act so as to prevent the hydrophilicity fall of the surface of this anti-glare and anti-fog element.

Required condition of each composition element of the anti-glare and anti-fog element according to this invention will be explained below.

Substrate which has a Wave Length Selective Property

As a substrate which has a wave length selective property used for an anti-glare and anti-fog element according to this invention, colored glass substrate colored so that it may have the alternative reflective characteristic as will be described hereunder, or a substrate wherein an interference film is formed on the transparent glass substrate can be used. Thickness of these substrates is used as predetermined thickness according to the purpose of use.

Colored Glass Substrate

In an anti-glare and anti-fog element according to this invention, colored glass substrate which causes the light of a predetermined region to be alternatively reflected can be used. A colored glass substrate wherein various kinds of colorants are added onto a transparent glass substrate can be used as such a colored glass. For example, colored glass substrate as shown in Table 1 is mentioned.

TABLE 1

| Color of glass | Main colorants |
| --- | --- |
| Purple | A Mn + Cu system, Co system |
| Blue | Co system, Cu system |
| Green | Cr system, Fe system, Cu system |
| Green (Fluorescence color) | U (uranium) system |
| Yellow | Cu system, nickel system, Cr system, Cd system |
| Brown | Fe + S system (C is used together as a reducing agent.) |
| Yellowish red | Se + Cd system |
| Red | Au system, Cu system, Co system, a Se + Cd system |
| Reddish purple | Nd system, Mn system |
| Black | Mix of the various colorants such as Mn system, Cr system, nickel system, Co system, Fe system, and Cu system |
| Milky white | CaF2 system, a NaF system, CaPO4 system |

Table 1 shows various kinds of colorants and color phase presented by various kinds of colored glass substrates to which these colorants are added. As shown in Table 1, the colored glass substrate colored in various colors can be obtained by adding any one sort of the aforementioned colorant independently to the transparent glass substrate, or by mixing and adding two or more colorants.

(Substrate with an Interference Film Formed on a Transparent Substrate)

On the other hand, as a substrate having a wave length selective property used for an anti-glare and anti-fog element according to this invention, a substrate (referred as only an "interference substrate" henceforth) wherein an interference film presenting an interference color by the interference action of light is formed on a transparent substrate can be used. In this invention, especially kinds of the aforementioned interference film are not limited. If adhesion property with a hydrophilic functional film included in this invention is good, and the anti-glare and anti-fog characteristic of this invention is not impeded, various kinds of interference films can be used. For example, various kinds of metal oxides as such an interference film are mentioned. However, in view of a good adhesion property with the hydrophilic functional film included in this invention, for example the interference film formed by titanium oxide film independently or a silicon oxide film independently, formed by laminated films of titanium oxide and the silicon oxide, or formed by mixed films of the both are mentioned. Such an interference substrate comes to present color phase by various interference colors according to the thickness of the interference film formed on this substrate. Also, as the transparent substrate used by this invention, as will be referred hereunder, a transparent substrate can be chosen out of conventionally known transparent glass substrates according to the purpose of use as needed.

FIG. 10 is a graph showing the reflective characteristic (wavelength dependability of reflectance) presented by the glass substrate which formed $TiO_2$ film having various thickness on a transparent glass substrate. FIG. 10A is a view showing spectral reflectance characteristics of an interference substrate with 120 nm thickness of already formed $TiO_2$ film. In this interference substrate, the alternative reflective characteristic wherein the reflectance of about 380 to 400 nm region (purple) becomes higher is exhibited and color phase of purple tone is presented. Also FIG. 10B is a view showing spectral reflectance characteristics of the interference substrate with 140 nm thickness of already formed $TiO_2$ film. In this interference substrate, the alternative reflective characteristic wherein the reflectance of an about 430 to 450 nm region (blue) becomes higher is exhibited, and color phase of green tone is presented.

Further, FIG. 10C is a view showing spectral reflective characteristic of an interference substrate with 160 nm thickness of already formed $TiO_2$ film. In this interference substrate, the alternative reflective characteristic such that the reflectance of the light of an about 480 to 500 nm region (green) becomes higher is exhibited. And FIG. 10D is a view showing spectral reflectance characteristics of the interference substrate with 180 nm thickness of already formed $TiO_2$ film. In this interference substrate, the alternative reflective characteristics such that the reflectance in the range of about 530 to 550 nm region (yellow) becomes high is exhibited, and color phase of yellow tone is presented.

A substrate having Titanium oxide ($TiO_2$) film independently was mentioned as an example here as an interference substrate according to this invention. Other than this, an interference substrate which comprises both of titanium oxide film and silicon oxide film or silicon oxide film independently or other metal oxides may be included. Also, if the interference substrate according to this invention is constituted so that both of titanium oxide film and a porous silicon oxide film are included, the above-described spectral reflectance characteristics and a high hydrophilic function can be exhibited simultaneously. Whereby, the interference substrate which allows a coexistence of expected wave length selective property and an expected hydrophilic function is obtained.

In addition, especially the formation method of the film used for an anti-glare and anti-fog element according to this invention is not construed as being limited thereto but may be substituted with other method which can form the film comprising titanium oxide film and silicon oxide film capable of exerting the effect of this invention, or a method of forming the film comprising other substances used as needed. As such a film formation method, for example gaseous phase formation methods, which are conventionally known methods such as vacuum deposition method, a sputtering method, and a plasma CVD (CVD: Chemical vapor deposition, chemistry gaseous phase membrane formation) method, or liquid phase formation methods such as a sol gel process can be used.

Also, when forming the above-described titanium oxide film and a silicon oxide film by gaseous phase formation methods, by controlling oxygen partial pressure in film formation atmosphere, chemistry quantum composition ration of titanium oxide film or a silicon oxide film can be suitably changed.

Namely, it is conventionally known that when the general formula of titanium oxide film is expressed as TiOx ($0<x\leq2$) and the general formula of a silicon oxide film is expressed as SiOy ($0<y\leq2$), if oxygen partial pressure in film formation atmosphere is made comparatively high and the film formation is carried out, value of x or y in the aforementioned general formula becomes large, and this allows the amount of oxygen contained in these films to be increased, and also allows the fine property of the film to be low. Moreover, it is conventionally known that if oxygen partial pressure in film formation atmosphere is made low and film formation is carried out, value of x or y in the aforementioned general formula becomes low, and this allows the molecule of the amount of oxygen of these oxides to be decreased, and also allows the fine property of the film to be high.

Thus, based on the phenomenon in which a fine property of titanium oxide film or a silicon oxide film changes depending on the size of oxygen partial pressure in film formation atmosphere, by changing gradually or continuously the fine property of the depth direction of titanium oxide film or a silicon oxide film, it becomes possible to change the refractive index of these films suitably in the film formation. For example, when titanium oxide film is formed by a sputtering method on a glass substrate, film forming process advances in such a way that if oxygen partial pressure in sputtering atmosphere is changed gradually or continuously from higher pressure to lower pressure, fine property of the formed film will increase from a glass substrate side towards the outermost surface side. And corresponding to this, the refractive index of the aforementioned film also will increase from a glass substrate side towards the outermost surface side.

In a similar manner to the control of the chemistry quantum composition ration of titanium oxide film, a fine property of a silicon oxide film in the depth direction, and as a result, reflectance thereof can be suitably changed. Incidentally, by suitably changing oxygen partial pressure in film formation atmosphere during film formation as described above, the chemistry quantum composition ration in the depth direction of titanium oxide film or a silicon oxide film is controlled, and physical properties in the depth direction of these films is changed. This technique can be performed by deposition method or plasma CVD method, also.

Thus, by changing a refractive index in the depth direction of titanium oxide film, if the ¼-wave film of a high refractive index, and the ¼-wave film of a low refractive index are laminated alternately, both or either of a refractive index or the number of films can be adjusted suitably. This allows titanium oxide film having a desired reflectance to be obtained.

Hydrophilic Functional Film

A hydrophilic functional film included in the anti-glare and anti-fog element of this invention is formed on a substrate having the aforementioned wave length selective property, so that the surface of the anti-glare and anti-fog element may exhibit hydrophilicity. Whereby, water adhering to the surface of the anti-glare and anti-fog element having hydrophilicity is thinly damp in layer structure and spreads. This prevents this water from being formed in the surface of the anti-glare and anti-fog element in the shape of water-drip. Along with this, organic matters such as dirt adhering to the surface of the anti-glare and anti-fog element are also disassembled and removed. In this invention, as such a hydrophilic functional film, a photocatalyst substance which comprises titanium oxide having a photocatalyst function independently, or a substance which is constituted including the aforementioned photocatalyst substance and the hydrophilic substance having hydophilicity such as silicon oxide are preferably used.

Figure 13A:
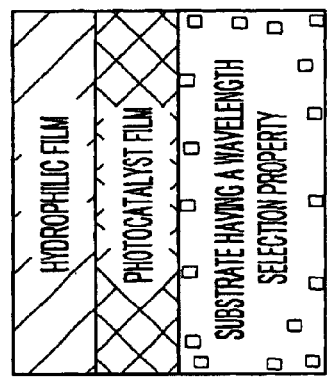
FIG. 13 is a cross-sectional view schematically showing a structure of various hydrophilic function films included in an anti-glare and anti-fog element according to this invention.
Figure 13C:
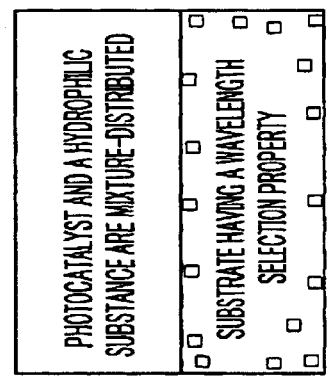
Figure 13B:
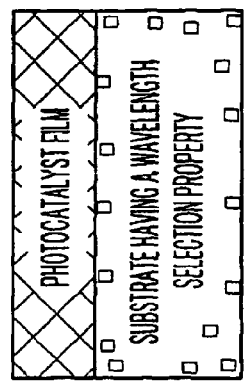

The cross-sectional structure of the hydrophilic functional film included in this invention will be schematically shown in FIGS. 13A, B, and C. Namely, in this invention, other than laminated structure of two films having a hydrophilic film comprising a photocatalyst film structured with a photocatalyst substance, and other substance as shown in FIG. 13A, the aforementioned photocatalyst film (single film) independently as shown in FIG. 13B, or a film with photocatalysis and other substance mixed and distributed (mixed film) may be constituted as composition films.

According to such a hydrophilic functional film, when ultraviolet rays are irradiated onto these electrochromic films, the aforementioned photocatalyst film is excited and activated, and dirt (or foreign substance), such as an organic matter adhering to the surface of the aforementioned hydrophilic film is disassembled and removed. Since the aforementioned photocatalyst film absorbs ultraviolet rays, photochromic phenomenon of the electrochromic films can also be suppressed. Further, if the aforementioned hydrophilic substance is structured with porous silicon oxide, hydrophilicity of the surface of the anti-glare and anti-fog element can be raised more. That is, if this hydrophilic functional film is structured with lamination structure having photocatalyst film comprising photocatalyst substance such as titanium oxide, and porous silicon oxide, photocatalyst function and hydrophilic function can be exhibited more greatly.

If the opening portion of hydrophilic film comprising such porous silicon oxide is constituted so that even the surface of a photocatalyst film may be reached, and direct contact of foreign substances such as an organic matter, NOx, which entered in the opening of porous silicon oxide, is possible in a photocatalyst film, photocatalyst effect over the aforementioned foreign substance is exhibited to the maximum extent resulting in full decomposition and removal of the aforementioned foreign substance. By the way in a hydrophilic functional film comprising porous silicon oxide and titanium oxide, even if the porous opening has not reached a photocatalyst film (that is, opening portion is intermediately closed before the photocatalyst film is reached), an excitation energy (in case of the aforementioned titanium oxide, energy of an ultraviolet-rays region mainly) which causes a photocatalyst reaction, transmits hydrophilic film comprising comparatively transparent porous silicon oxide. Moreover, since the aforementioned electron and electron hole pair generated on the photocatalyst film also transmits this hydrophilic film comprising comparatively transparent porous silicon oxide, the aforementioned foreign substance which entered and adhered can be disassembled and removed from the opening of this porous silicon oxide. In addition, if the surface coarseness (arithmetic average coarseness Ra) of this porous silicon oxide is set as 2 nm or more, higher hydrophilicity can be given to the aforementioned anti-glare and anti-fog element.

Transparent Substrate

Transparent substrate included in an anti-glare and anti-fog element of this invention is not limited, and can be suitably chosen from conventionally known substrates, so as to be adapted corresponding to the purpose of use. As such a transparent substrate, usual soda lime glass having a thickness according to the purpose of use can be used, for example.

Electrochromic Films

Referring to the electrochromic films included in an anti-glare and anti-fog element of this invention, if the effect of the anti-glare property of this invention can be exhibited, a conventionally known electrochromic substance can be used. Also any of various kinds of inorganic materials and organic materials can be used. Further, any of solid-like electrochromic substance film or solution comprising various kinds of electrochromic substances may be used. For example, the electrochromic substance having iridium oxide (IrOx) film which is an oxidized coloring film and tungsten oxide ($WO_3$) which is a reductive coloring film combined, can be used as a solid-like electrochromic substance film. Or as electrochromic solution, an electrochromic substance which exhibits an electrochromic phenomenon by the reaction mechanism of the chemical formula (1) shown below and comprising solution of viologen, can be used.

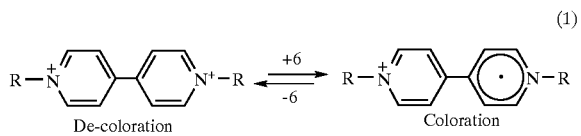

(1)

De-coloration    Coloration

This is described in R=n-$C_7H_{15}$ as shown in the above formula (1).

Embodiment 2
Transmitting Type Anti-glare and Anti-fog Element

Figure 3:
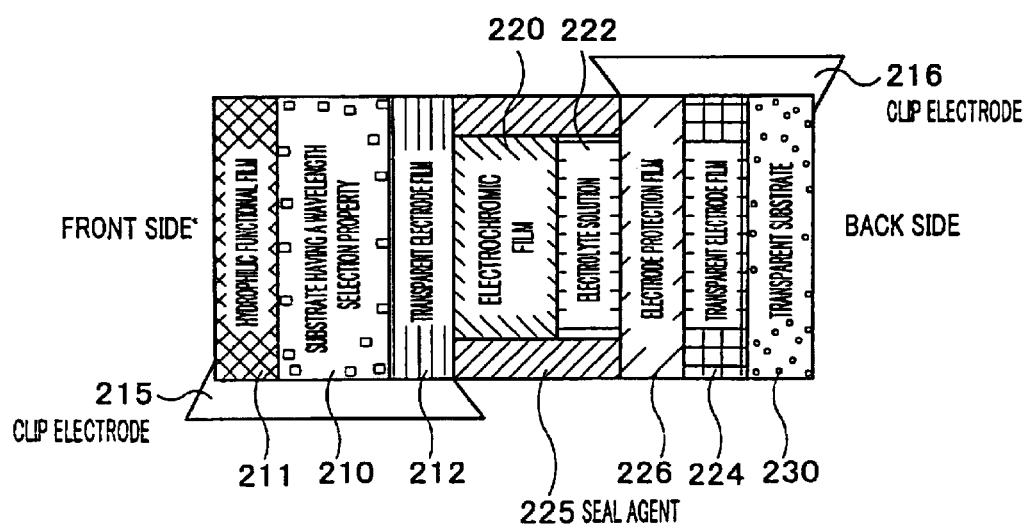
FIG. 3 is a block diagram schematically representing a structure of the embodiment 2 of an anti-glare and anti-fog element according to this invention, wherein a transmitting type is constituted.

As for an anti-glare and anti-fog element of the embodiment 2 according to this invention as shown in FIG. 3, hydrophilic functional film 211 comprising a photocatalyst substance (not shown) which comprises titanium oxide film, and a hydrophilic substance (not shown) which comprises silicon oxide, are formed on the front side of the front side substrate 210 having a wave length selective property and arranged in the front side (field where incidence of the light is carried out) of this element by a gaseous phase formation method. Transparent electrode film 212 by such as ITO is formed on the back side of this front side substrate 210. Furthermore, the electrochromic films 220 comprising such as $WO_3$ are formed on the backside of this transparent electrode film 212. Transparent electrode films 224 such as ITO or tin oxide, and the electrode protection films 226 such as silicon oxide, are formed one by one from this substrate side on the front side of the back side substrate 230 comprising a transparent glass substrate.

And between electrochromic films 220 and electrode protection film 226 is filled up with electrolyte such as lithium iodide, lithium perchlorate or solvent such as γ-butyrolactone, propylene carbonate, and electrolyte solution which comprises ultraviolet-rays absorbents such as benzophenone and a cyanoacrylate, and sealed by seal agent 225. Incidentally, when a photochromic phenomenon does not occur by an electrochromic substance, it is not necessary to add this ultraviolet-rays absorbent. This "photochromic phenomenon" means the phenomenon wherein a certain kind of substance is colored by irradiation of light (ultraviolet rays or visible light of short wavelength) in the state of a solid or solution, and returns to the original color again in a dark place.

And clip electrode 215 is put between one side of the front side substrate 210, and this clip electrode 215 is connected to transparent electrode film 212. Moreover, the clip electrode 216 is put between one side of the backside substrate 230, and this clip electrode 216 is connected to transparent electrode film 224. And while giving the voltage of positive polarity to the clip electrode 215 from the external power supply which is not shown, electrochromic films 220 are colored by giving the voltage of negative polarity to the clip electrode 216. And the colored electochromic film 220 is de-colored by giving respectively reverse polar voltage to these clip electrodes 215 and 216. Incidentally, when electrolyte solution 222 comprises combination of such as ferrocene and lithium perchlorate, it is also possible to short-circuit the transparent electrode film 212 and the transparent electrode film 224, and the colored electrochromic film 220 is de-colored. In addition, this electrode protection film 226 is intended to prevent the situation that iodine ion is absorbed in the surface of the transparent electrode film 224 and is not seceded therefrom, when a driving method is set as positive voltage feeding at the time of coloring and set as negative voltage feeding at the time of de-coloring. In other setup, this electrode protection film 226 is not needed.

Embodiment 3
Transmitting Type Anti-glare and Anti-fog Element

Figure 4:
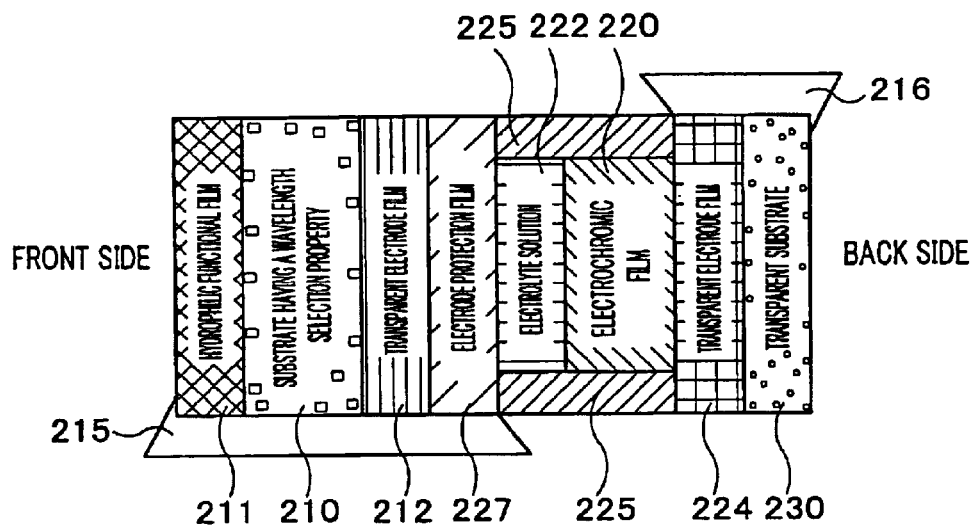
FIG. 4 is a block diagram schematically representing a structure of the embodiment 3 of an anti-glare and anti-fog element according to this invention, wherein a transmitting type is constituted.

In a structure as shown in FIG. 3 (embodiment 2), third embodiment of an anti-glare and anti-fog element as shown in FIG. 4 is constituted in such a way that transparent electrode film 212 and electrode protection film 227 such as silicon oxide by such as ITO are formed one by one on the backside of the front side substrate 210 having a wave length selective property. Transparent electrode film 224, such as ITO and tin oxide, and the electrochromic films 220 comprising such as $WO_3$ are formed one by one from this substrate side on the front side of the back side substrate 230 comprising a transparent glass substrate, and between the electrochromic films 220 and the electrode protection film 227 is filled up with electrolyte solution 222, and sealed by seal agent 225. The necessity for the electrode protection film 227 is compliant with embodiment 2.

Embodiment 4
Transmitting Type Anti-glare and Anti-fog Element

Figure 5:
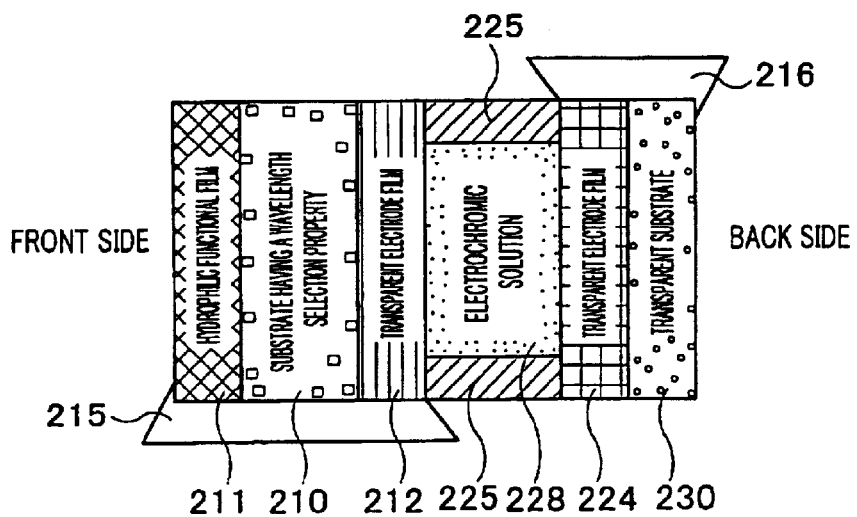
FIG. 5 is a block diagram schematically representing a structure of the embodiment 4 of an anti-glare and anti-fog element according to this invention, wherein a transmitting type is constituted.

An anti-glare and anti-fog element of the embodiment 4 shown in FIG. 5 is an example wherein electrochromic films 220 and electrolyte solution 222 in the structure shown in FIG. 3 or FIG. 4 (embodiment 2 or 3) are replaced with electrochromic substance such as viologen, or solvent such as γ-butyrolactone propylene carbonate, and electrochromic solution 228 including ultraviolet-rays absorbents such as benzophenone and cyanoacrylate as needed, and other structure is compliant with the embodiment 2 or 3.

Embodiment 5
Reflector Type Anti-glare and Anti-fog Element

Figure 6:
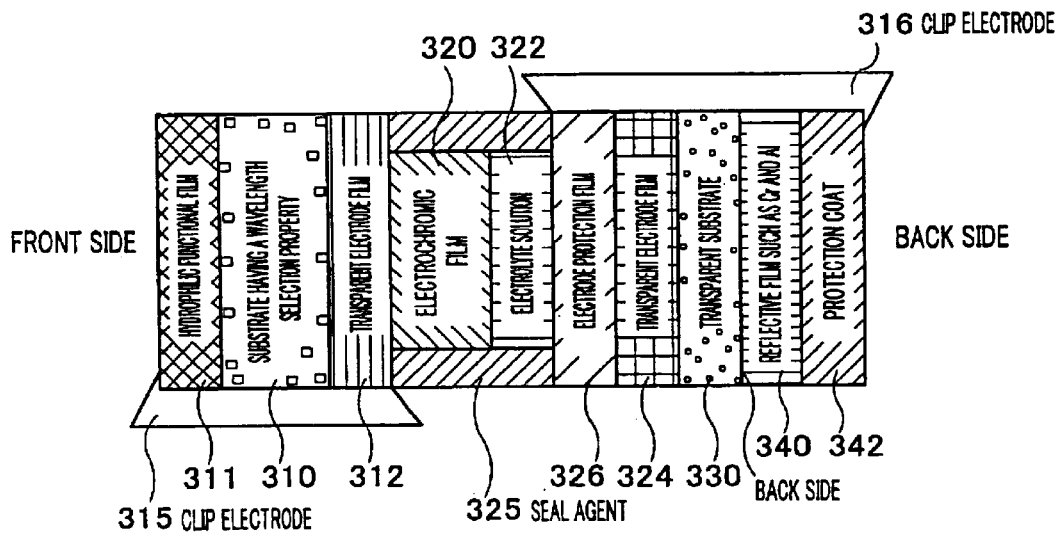
FIG. 6 is a block diagram schematically representing a structure of the embodiment 5 of an anti-glare and anti-fog element according to this invention, wherein a reflector type is constituted.

An anti-glare and anti-fog element of the embodiment 5 shown in FIG. 6 provides and constitutes a reflective film on the backside of the transparent substrate 230 which is arranged on the backside in a structure shown in FIG. 3 (embodiment 2). That is, FIG. 5 is a view showing reflective film 340 comprising such as Cr and Al, and protection coat 342 for protecting this reflective film physically and chemically is formed from substrate 330, on the backside of backside substrate 330 comprising a transparent glass, to thereby constitute a reflector. Incidentally, especially when this anti-glare and anti-fog element is installed in the environment where corrosion of a reflective film is hard to be generated, this protection coat 342 is not necessarily provided.

Reflective Film

As for a reflective film included in an anti-glare and anti-fog element of this invention, a material to allow a specular surface formation on a glass substrate and a relatively high reflectance, or a metal material to allow a specular surface formation on a predetermined part of the electrochromic films as will be referred below as needed, which is capable of power feeding thereto, are usable. In this invention, in view of good adhesion property to a glass substrate and various kinds of oxide films, and excellence in corrosion resistance of the very stable oxide film formed on the surface and also excellence in economical efficiency, passive metal such as Al and Cr or alloy comprising these metal as main composite substance are conveniently used for a reflective film. Such a reflective film can be formed using a gaseous phase formation methods such as a usual deposition method or a usual sputtering method, and the like. If such a gaseous phase formation method is used, two or more mutually different films which constitute electrochromic films can be formed continuously. This makes it possible to achieve a shortened manufacturing time and reduction in the cost of manufacture.

Embodiment 6
Reflector Type Anti-glare and Anti-fog Element

Figure 7:
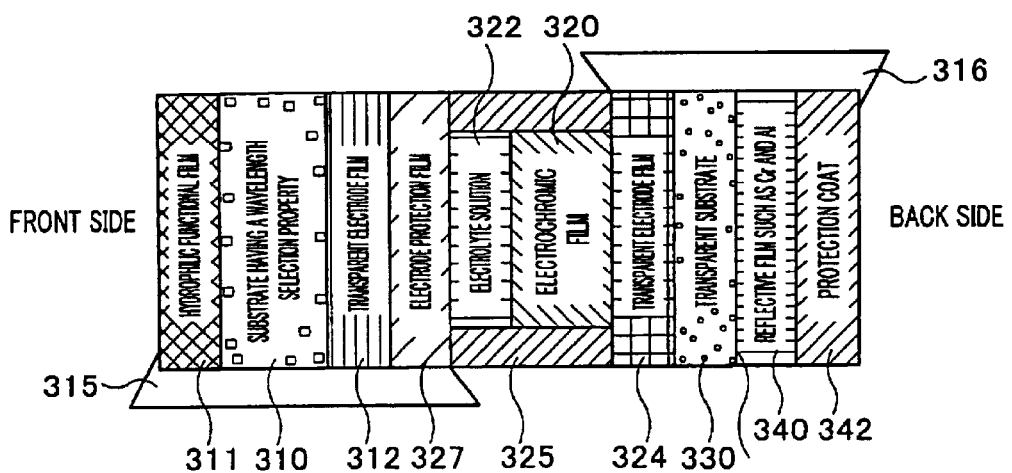
FIG. 7 is a block diagram schematically representing a structure of the embodiment 6 of an anti-glare and anti-fog element according to this invention, wherein a reflector type is constituted.

An anti-glare and anti-fog element of the embodiment 6 shown in FIG. 7 provides and constitutes a reflective film in a structure shown in FIG. 4 (embodiment 3) on the backside of the transparent substrate 230 which is arranged on the backside. That is, on the back side of the back side substrate 330 comprising transparent substrate (glass), reflective film 340 which comprises such as Cr, Al, from this substrate 330, protection coat 342 for protecting physically and chemically this reflective film 340, are formed, to thereby constitute a reflector. Incidentally, as similarly to the aforementioned embodiment 5, when this anti-glare and anti-fog element is installed in the environment where corrosion of a reflective film is hard to be generated, this protection coat 342 is not necessarily provided.

Embodiment 7
Reflector Type Anti-glare and Anti-fog Element

Figure 8:
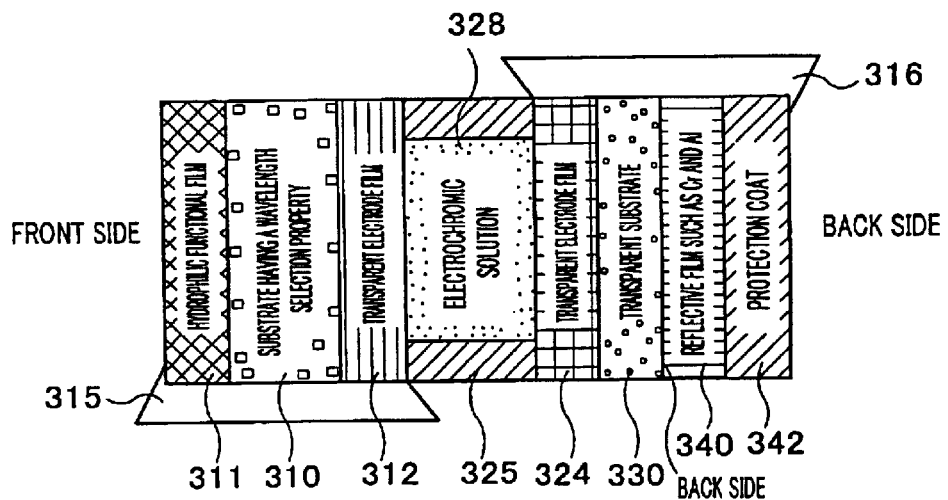
FIG. 8 is a block diagram schematically representing a structure of the embodiment 7 of an anti-glare and anti-fog element according to this invention, wherein a reflector type is constituted.
Figure 9:
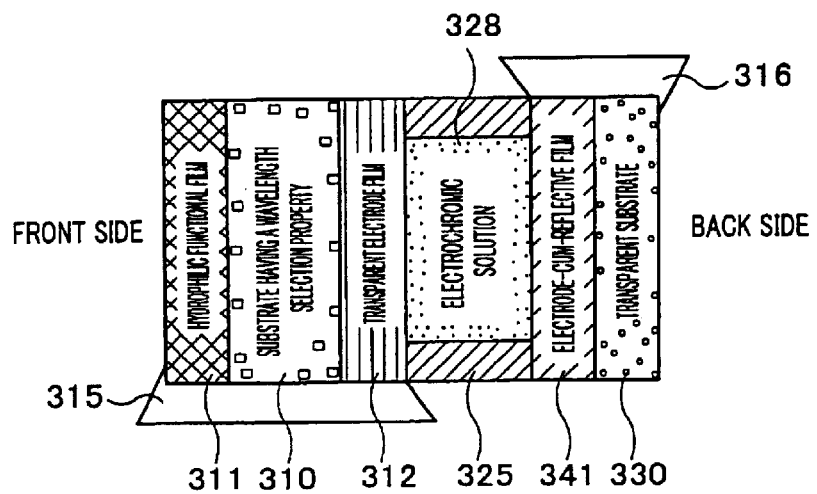
FIG. 9 is a block diagram schematically representing a structure of the embodiment 9 of an anti-glare and anti-fog element according to this invention, wherein a reflector type is constituted, with a reflective film serving as an electrode of electrochromic films.

An anti-glare and anti-fog element of embodiment 7 shown in FIG. 8 provides and constitutes a reflective film on the back side of the transparent substrate 230 which is arranged on the backside, in a structure shown in FIG. 5 (Embodiment 4). That is, on the back side of the back side substrate 330 which comprises transparent substrate (glass), reflective film 340 from this substrate 330, and protection coat 342 for protecting physically and chemically this reflective film 340 are formed, to thereby constitute a reflector. Incidentally, as similar to the aforementioned embodiment 5, when this anti-glare and anti-fog element is installed in the environment where corrosion of a reflective film is hard to be generated, this protection coat 342 is not necessarily provided.

Embodiment 8
Reflector Type Anti-glare and Anti-fog Element

An anti-glare and anti-fog element of embodiment 8 of this invention shown in FIG. 1 is a replaced example of transparent electrode film 124 in the structure of the transmitting type element shown in FIG. 2 (embodiment 1) with electrode-cum-reflective film 40, to thereby constitute a reflector. The anti-glare and anti-fog element of this invention which is provided with the electrode-cum-reflective film 40 which serves both as an electrode and a reflective film, constituting a reflector as shown in FIG. 1 is constituted in such a way that front side substrate 10 comprising a substrate having a wave length selective property as a substrate and backside substrate 30 comprising a transparent glass substrate are arranged in an opposing manner, and electrochromic films 20 which exhibit an electrochromic phenomenon are intervened between these front side substrate 10 and the back side substrate 30.

Hydrophilic functional film 11 comprising photocatalyst film 11a which comprises a photocatalyst substance having photocatalyst functions such as titanium oxide, and hydrophilic film 11b which comprises a hydrophilic substance having hydrophilicity such as silicon oxide, are formed on the front side of the front side substrate 10. This hydrophilic functional film 11 produces hydrophilicity onto the surface of an element. Adhesion of water-drip is thus prevented and anti-fog effect is given to the element. Also, photocatalyst film 11a included in the hydrophilic functional film 11 is effective in order to have the action to carry out decomposition removal of the organic matters such as dirt which adhered to the surface of the element, and the hydrophilicity of the surface of the element is held. Incidentally, in this way this hydrophilic functional film 11 can be structured with a lamination structure which comprises a film of a photocatalyst substance and a film of other hydrophilic substances, and also may be structured with a photocatalyst substance independently, or with a film which mixes with other substances in a distributed manner. In addition, as for the aforementioned hydrophilic substance, porous silicon oxide film serves as a composition substance preferably.

Also, transparent electrode film 12 and transparent electrode film 13 comprising such as indium tin oxide (ITO: Indium tin oxide), tin oxide ($SnO_2$), are formed on the backside of front side substrate 10. In addition, processing of etching and the like is performed between above both films, and a predetermined insulating film (not shown) or a predetermined oxidized coloring film (not shown) is formed. And this oxidized coloring film 21, the electrolyte film 22 which comprises solid electrolytes such as tantalum oxide, and the reductive coloring film 23 which comprises such as tungstic oxide and molybdenum oxide, are formed one by one, to thereby constitute electrochromic films 20.

Furthermore, an electrode-cum-reflective film 40 which is a reflective film serving as an electrode is formed on the backside of reductive coloring film 23, and this electrode-cum-reflective film 40 is connected to transparent electrode film 13. In addition, these electrochromic films 20 and the electrode-cum-reflective film 40 are sealed between this front side substrate 10 and the back side substrate 30 by seal agent 25 which is circumferentially arranged. Incidentally, this seal agent 25 is not construed as being limited thereto but may be substituted by epoxy resin, for example as seal agent 25 without impeding the effect of this invention.

In addition, embodiment 8 which is a reflector type anti-glare and anti-fog element of this invention here is constituted as in the following. That is, photocatalyst film 11a is determined as anatase type $TiO_2$ with thickness of 140 nm, and hydrophilic film 11b is determined as a porous $SiO_2$ with thickness of 10 nm. Also, the colored glass substrate made in U.S. PPG (brand name; Solextra) is used as a front side substrate having a wave length selective property. Furthermore, composite substance of electrochromic films 20 is determined as transparent electrode films 12 and 13 comprising ITO with thickness of 200 nm, an oxidized coloring film 21 comprising IrOx with thickness of 100 nm, and a reductive coloring film 23 comprising $Ta_2O_5$ with thickness of 600 nm. Moreover, these electrochromic films 20 are sealed by a seal agent comprising epoxy system adhesives. Furthermore, electrode-cum-reflective film 40 is constituted by an Al metal film with thickness of 100 nm, and the soda lime glass with thickness of 1.1 mm is used as a backside substrate 30 comprising transparent glass substrate.

Furthermore, clip electrodes 15 and 16 connected to the external power supply which is not shown is connected to transparent electrode film 12 and transparent electrode film 13 respectively, so as to electrically energize electrochromic films 20 to color or de-color these films. That is, by giving the voltage of negative polarity to the clip electrode 16 while giving the voltage of positive polarity to the clip electrode 15 from an external power supply (not shown), the electrochromic films 20 are colored. The colored electrochromic films 20 are decolorized by giving respectively reverse polar voltage to these clip electrodes 15 and 16, or by short-circuiting between the clip electrode 15 and 16.

Embodiment 9
Reflector Type Anti-glare and Anti-fog Element

An anti-glare and anti-fog element of embodiment 9 of this invention shown in FIG. 1 is a replaced example of transparent electrode film 224 in a structure of the transmitting type element shown in FIG. 5 with electrode-cum-reflective film 341, to thereby constitute a reflector.

Figure 11:
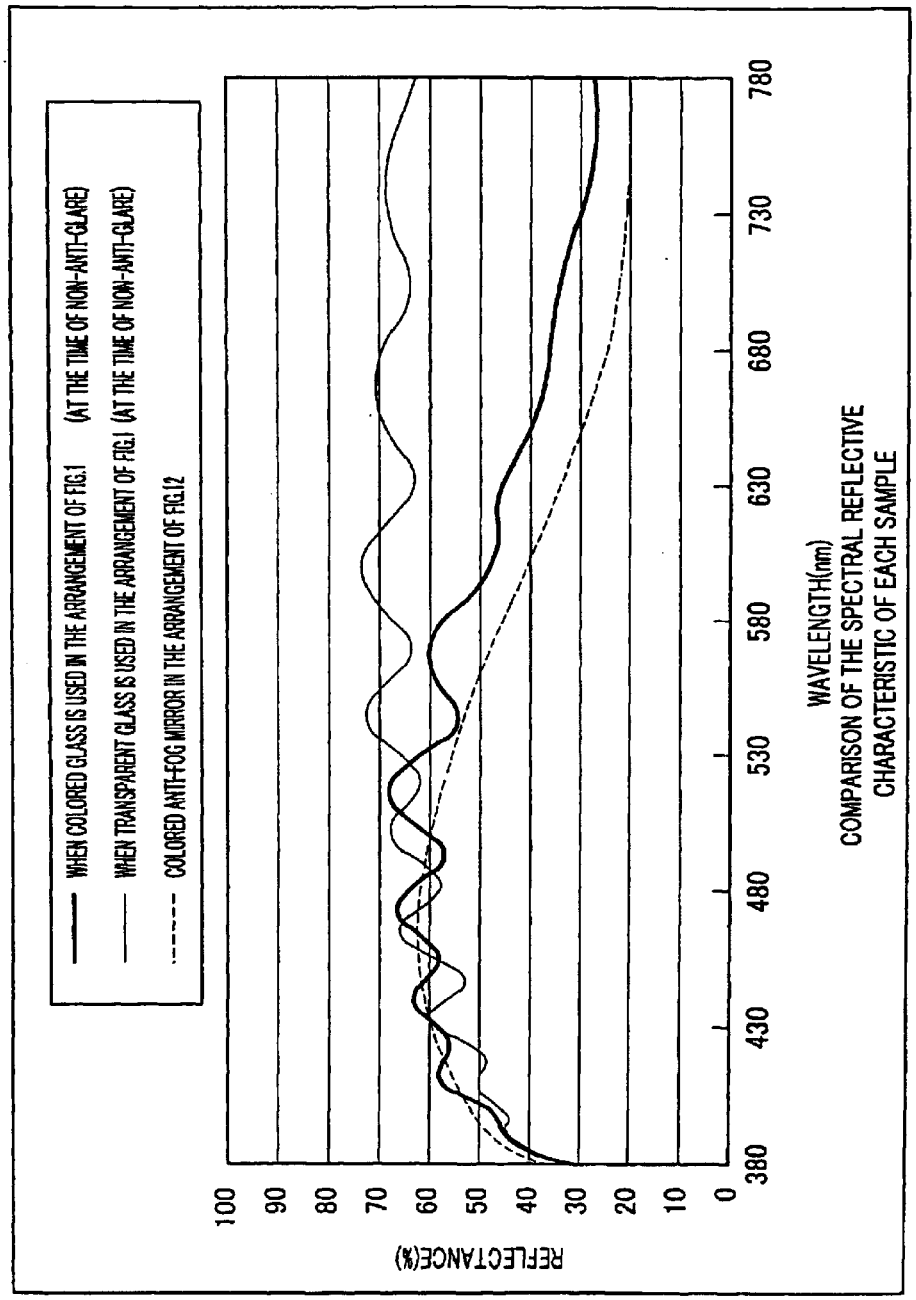
FIG. 11 is a graph showing a comparison in spectral reflectance characteristics of the embodiment 8 of an anti-glare and anti-fog element according to this invention, an anti-glare and anti-fog element with a structure of FIG. 1, and a colored anti-fog mirror having a structure of FIG. 12.

As for an anti-glare and anti-fog element of this invention, spectral reflectance characteristics at the time of un-operating and spectral reflectance characteristics of a reflector having no anti-glare and anti-fog function in this structure of anti-glare and anti-fog element will next be compared to evaluate about a difference in color-phase of the both. Each spectral reflectance characteristics of commercial blue colored glass substrate (the product made in U.S. PPG, brand name: Solextra), and a usual transparent glass substrate (soda lime glass) applied respectively to a reflector type anti-glare and anti-fog element of this invention (the aforementioned embodiment 8) as shown in FIG. 1 is compared and shown in FIG. 11. As shown in FIG. 11, spectral reflectance characteristics of an anti-glare and anti-fog element employing the aforementioned blue colored glass substrate shows that a reflectance near about 400–550 nm is higher, presenting a color phase of blueness.

Figure 12:
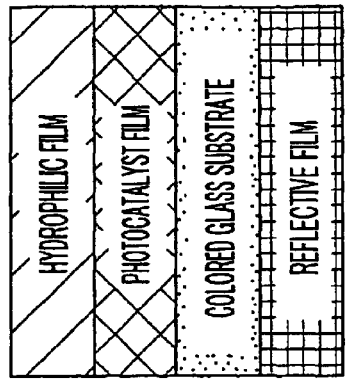
FIG. 12 is a cross-sectional view, schematically representing a structure of a colored anti-fog mirror using a colored glass substrate.

Also, as shown in FIG. 11, spectral reflectance characteristics (thick line showing an anti-glare function (electrochromic function) at the time of un-operating.) of the reflector type anti-glare and anti-fog element (above embodiment 8) of this invention employing the aforementioned blue colored glass substrate as shown in FIG. 1 was almost equivalent to the spectral reflectance characteristics (dotted line) of colored anti-fog mirror structured with hydrophilic film including a photocatalyst substance as shown in FIG. 12 colored glass substrate and a reflective film, that is, with no anti-glare function. As for an exemplary embodiment other than embodiment 8 shown here, when similar comparison experiment with this was conducted, almost the same result as such embodiment 8 was obtained. This elucidated that reflector type anti-glare and anti-fog element of this invention can be set to have almost same spectral reflectance characteristics as anti-fog mirror with no anti-glare function even at the time of un-operating.

Further, in a case that oil was applied to the surfaces of the samples of the embodiments 1 to 9 explained above ultraviolet rays (intensity: 1.0 mW/cm2) are irradiated thereon to check the change of a water-drip contact angle which was formed in the predetermined size on this surfaces of the samples, to thereby evaluate the anti-fog property on each surface of a sample. Incidentally, in order to compare the above case, samples with no photocatalyst film were fabricated, and the oil is applied to the surface thereof to be subjected to the irradiation of the ultraviolet rays. And the water-drip contact angle was also measured. Consequently, as for each sample of the embodiments 1 to 9, it was checked that as irradiation time of ultraviolet rays elapsed, the aforementioned water-drip contact angle was decreased gradually and, the irradiation time of ultraviolet rays elapsed 4 hours or more, the aforementioned water-drip contact angle became 5 degrees or less, and water-drip formed on the surface of the sample was getting damp and spreading in thin layered structure. On the other hand, as for the sample having no photocatalyst film in the embodiments 1 to 9, the aforementioned water-drip contact angle was not decreased, and it was not be observed that water-drip which was formed on the surface of the sample was getting damp and spreading. As for the anti-glair and anti-fog element of this invention, above result elucidated that an organic matter adhering to the surface is disassembled by the photocatalyst action of a hydrophilic functional film, and anti-fog property is exhibited.

Incidentally, the present invention is not limited to the above-explained various embodiments, but may be modified as needed without departing from the technical spirit and scope of the invention. For example, especially the thickness of various films, such as thickness of the substrate having the aforementioned wave length selective property, or transparent glass substrate, and a photocatalyst film, a hydrophilic functional film or electrochromic films, are not limited, but are determined as needed.

Also, while a reflective film is formed on the backside of a backside substrate viewed from the front side substrate of the aforementioned anti-glare and anti-fog element, an anti-glare and anti-fog element which is formed in such a way that a resistance heating element (for example, PTC (panel-like heater using a positive characteristic thermistor)) is electrically energized on the backside of this reflected film, may also be constituted. By employment of this constitution, by electrically energizing to the aforementioned resistance heating element for this to be heated, it becomes possible to evaporate the water adhering to the surface of this element, and raise visibility further.

And the anti-glare and anti-fog element of this invention thus constituted is preferable for an exterior mirror for automobiles. In the exterior mirror for automobiles according to this invention, it can be set up so that both an anti-glare function and an anti-fog function may be provided and predetermined color phase may be presented at the time of un-operating of the aforementioned anti-glare function. For example, when a car is constituted in such a way that the exterior mirror for automobiles of this invention is used as a driver's seat side mirror of a car, and a passenger seat side mirror has only an anti-fog function, color phase of a driver's seat side mirror is set up so that the driver's side mirror may present equal color phase with a passenger seat side mirror at the time of un-operating of the anti-glare function of a driver's seat side mirror. That is, by choosing a substrate which has a wave length selective property included in a driver's seat side mirror, it becomes possible for a man not to have a sense of incongruity resulting from the difference in color phase between a driver's seat side mirror and a passenger seat side mirror.

In an exterior mirror for automobiles equipped with an anti-glare and anti-fog function, this invention is adapted to be used for the exterior mirror for automobiles, wherein a predetermined color phase is presented at the time of un-operating of the anti-glare and anti-fog function, provided with chemical stability and capability of disassembling the dirt adhering to the surface is fully exhibited, in order to achieve a high anti-fog property.

Further, this invention predetermines color phase of the mirrors which have a mutually different function among plurality of mirrors, and it is preferable for the exterior mirror for automobiles and it becomes possible to set this color phase to the same extent. Thus, combination of the mirrors which does not give a sense of incongruity visually can be achieved and adapted preferably to an exterior mirror for automobiles

What is claimed is:

1. An anti-glare and anti-fog element having an anti-glare function with an electrochromic film for exhibiting and electrochromic phenomenon interposed between a transparent substrate arranged on the front side and a transparent substrate arranged on the backside, wherein the transparent substrate of the front side comprises a substrate having a wave-length selective property, and a hydrophilic functional film including a photocatalyst film having light transmittivity comprising a photocatalyst substance is formed, to thereby give an anti-fog function.

2. An anti-glare and anti-fog element as described in claim 1, wherein said hydrophilic functional film is formed independently by a photocatalyst film comprising a photocatalyst substance of titanium oxide.

3. An anti-glare and anti-fog element as described in claim 1, wherein said hydrophilic functional film includes a photocatalyst film comprising a photocatalyst substance of titanium oxide, and a hydrophilic film comprising a hydrophilic substance of silicon oxide.

4. An anti-glare and anti-fog element as described in claim 3, wherein said hydrophilic film comprises a porous silicon oxide.

5. An anti-glare and anti-fog element as described in claim 1, wherein a reflective film is formed on the backside of the backside substrate viewed from the front side transparent substrate having a wave-length selective property of said anti-glare and anti-fog element, to thereby constitute an anti-glare and anti-fog mirror.

6. An anti-glare and anti-fog element as described in claim 2, wherein a reflective film is formed on the backside of the backside substrate viewed from the front side transparent substrate having a wave-length selective property of said anti-glare and anti-fog element, to thereby constitute an anti-glare and anti-fog mirror.

7. An anti-glare and anti-fog element as described in claim 3, wherein a reflective film is formed on the backside of the backside substrate viewed from the front side transparent substrate having a wave-length selective property of said anti-glare and anti-fog element, to thereby constitute an anti-glare and anti-fog mirror.

8. An anti-glare and anti-fog element as described in claim 4, wherein a reflective film is formed on the backside of the backside substrate viewed from the front side transparent substrate having a wave-length selective property of said anti-glare and anti-fog element, to thereby constitute an anti-glare and anti-fog mirror.

9. An anti-glare and anti-fog element as described in claim 1, wherein a reflective film is formed on the front side of the backside substrate viewed form the front side transparent substrate having a wave-length selective property of said anti-glare and anti-fog element, wherein said reflective film serves also as an electrode for supplying power to said electrochromic films, to thereby constitute an anti-glare and anti-fog mirror.

10. An anti-glare and anti-fog element as described in claim 2, wherein a reflective film is formed on the front side of the backside substrate viewed form the front side transparent substrate having a wave-length selective property of said anti-glare and anti-fog element, wherein said reflective film serves also as an electrode for supplying power to said electrochromic films, to thereby constitute an anti-glare and anti-fog mirror.

11. An anti-glare and anti-fog element as described in claim 3, wherein a reflective film is formed on the front side of the backside substrate viewed form the front side transparent substrate having a wave-length selective property of said anti-glare and anti-fog element, wherein said reflective film serves also as an electrode for supplying power to said electrochromic films, to thereby constitute an anti-glare and anti-fog mirror.

12. An anti-glare and anti-fog element as described in claim 4, wherein a reflective film is formed on the front side of the backside substrate viewed form the front side transparent substrate having a wave-length selective property of said anti-glare and anti-fog element, wherein said reflective film serves also as an electrode for supplying power to said electrochromic films, to thereby constitute an anti-glare and anti-fog mirror.

13. An exterior mirror for automobiles comprising an anti-glare and anti-fog element as described in claim 5.

14. An exterior mirror for automobiles comprising an anti-glare and anti-fog element as described in claim 6.

15. An exterior mirror for automobiles comprising an anti-glare and anti-fog element as described in claim 7.

16. An exterior mirror for automobiles comprising an anti-glare and anti-fog element as described in claim 8.

17. An exterior mirror for automobiles comprising an anti-glare and anti-fog element as described in claim 9.

18. An exterior mirror for automobiles comprising an anti-glare and anti-fog element as described in claim 10.

19. An exterior mirror for automobiles comprising an anti-glare and anti-fog element as described in claim 11.

20. An exterior mirror for automobiles comprising an anti-glare and anti-fog element as described in claim 12.

* * * * *